A. BARCHIESI.
DOUBLE AUTOMATIC VALVE CLOSER.
APPLICATION FILED MAY 29, 1920.
1,375,074.
Patented Apr. 19, 1921.
2 SHEETS—SHEET 1.
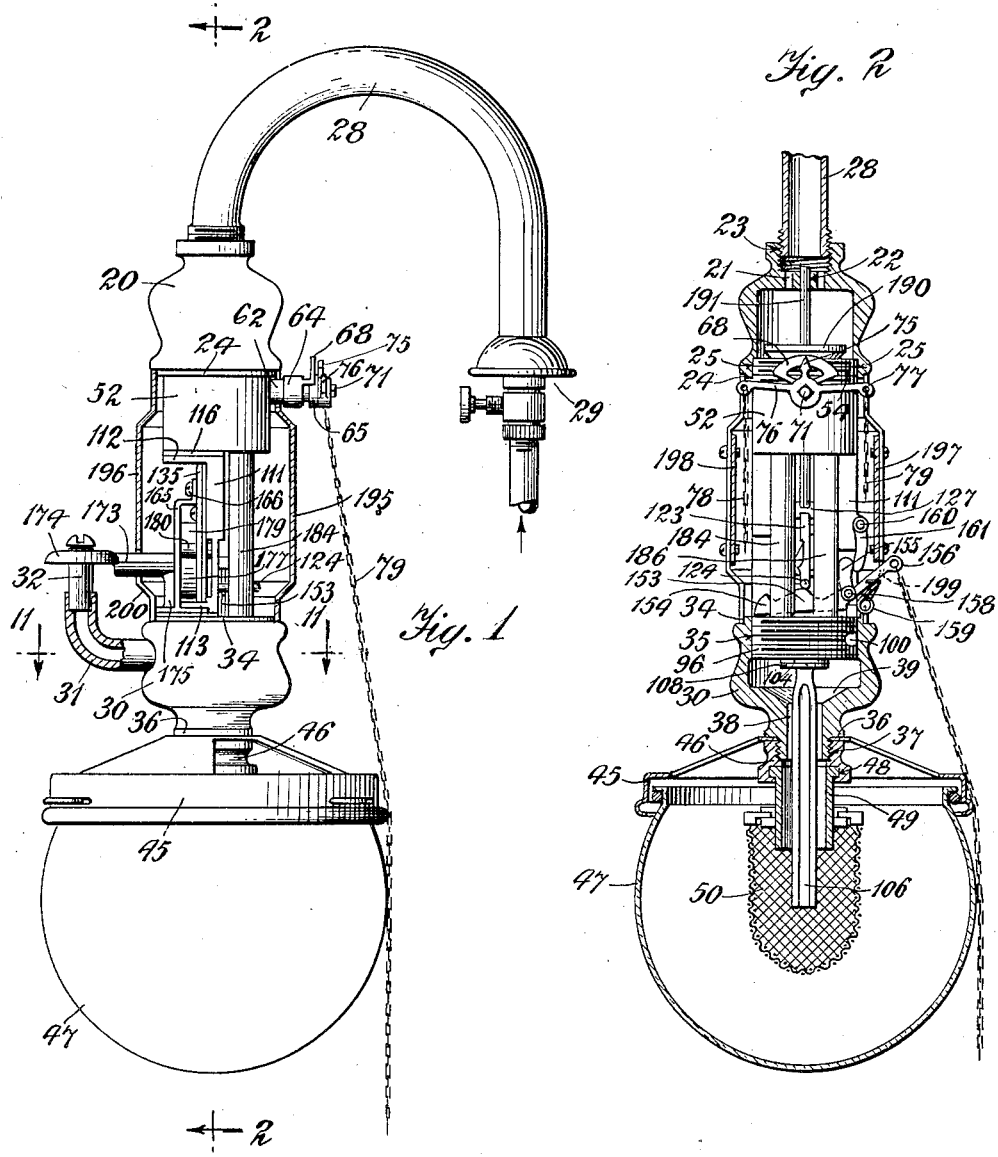
Inventor
Aurelio Barchiesi
By his Attorney
A. A. de Bonneville A. BARCHIESI.
DOUBLE AUTOMATIC VALVE CLOSER.
APPLICATION FILED MAY 29, 1920.
1,375,074.
Patented Apr. 19, 1921.
2 SHEETS—SHEET 2.
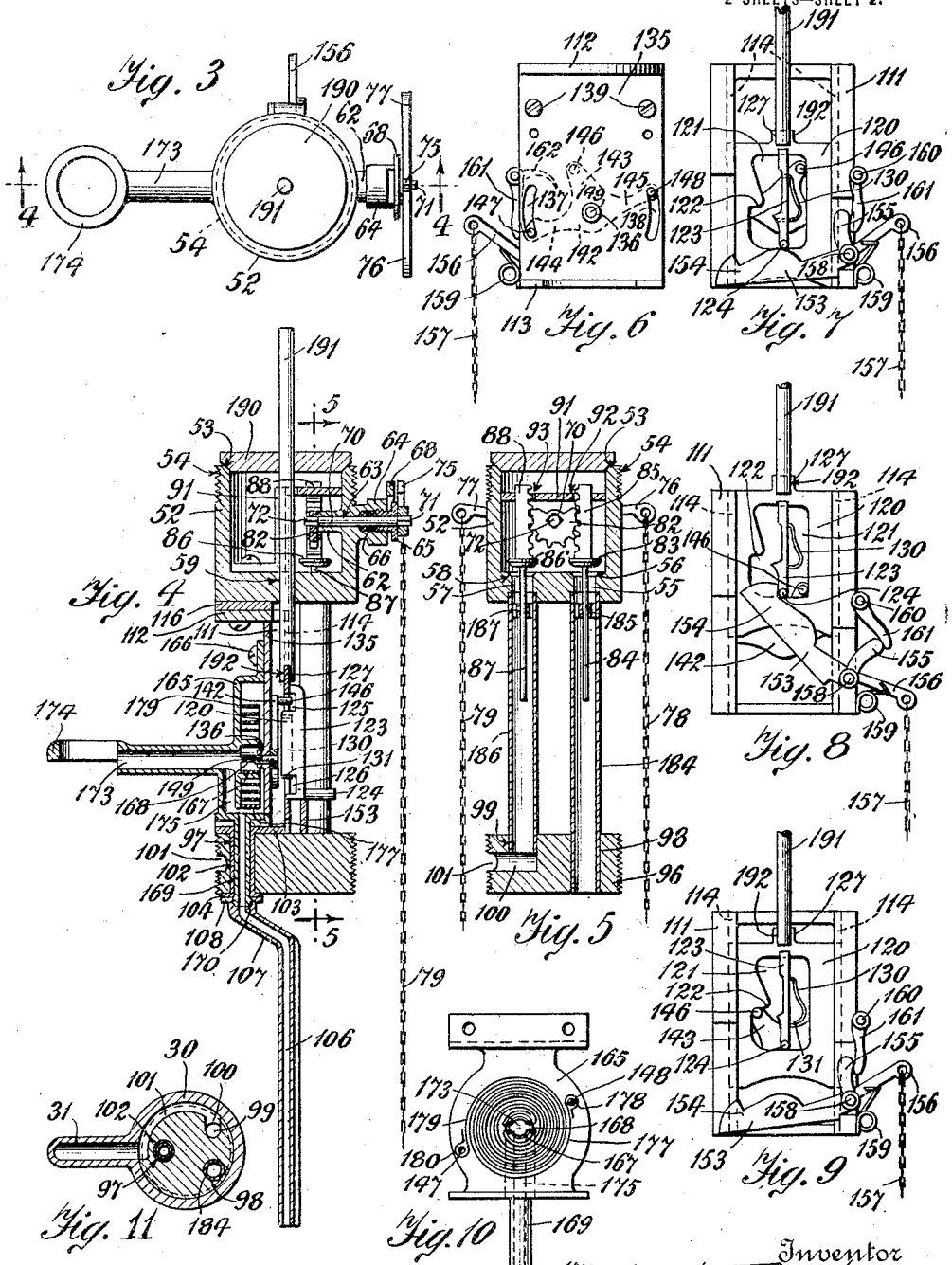

UNITED STATES PATENT OFFICE.

AURELIO BARCHIESI, OF JERSEY CITY, NEW JERSEY, ASSIGNOR OF ONE-FIFTH TO ANGELO BARATTA, OF JERSEY CITY, NEW JERSEY, ONE-FIFTH TO GIOVANNI SQUARCIALUPI AND ONE-FIFTH TO LOUIS L. BOLLINE, BOTH OF NEW YORK, N. Y.

DOUBLE AUTOMATIC VALVE-CLOSER.

1,375,074.  Specification of Letters Patent.  Patented Apr. 19, 1921.

Application filed May 29, 1920. Serial No. 385,140.

*To all whom it may concern:*

Be it known that I, AURELIO BARCHIESI, a subject of the King of Italy, and resident of Jersey City, in the county of Hudson and State of New Jersey, have invented certain new and useful Improvements in Double Automatic Valve-Closers, of which the following is a specification.

This invention relates to a double automatic valve closer and is arranged to alternately supply gas to a gas tip or a gas mantle.

Its organization comprises a locking pin or a swinging element which is located in different positions by the tension of a spring. The spring is within the heat zone of the light controlled and expands when said light is burning and contracts when the light is extinguished. The said pin coacts with a main gas valve of the closer. The said pin in one position maintains the valve open and off of its seat, and another position permits the valve to be closed by gravity.

Figure 1 represents an elevation of the automatic valve closer with a portion thereof in axial section; Fig. 2 shows a partial section of Fig. 1 on the line 2, 2; Fig. 3 is a top plan view of Fig. 4; Fig. 4 represents a section of Fig. 3 on the line 4, 4; Fig. 5 is a section of Fig. 4 on the line 5, 5; Fig. 6 shows an elevation of some details of the valve closer; Fig. 7 represents a rear view of Fig. 6; Figs. 8 and 9 are views similar to Fig. 7 with some of the elements in different positions; Fig. 10 shows an elevation of some elements of the invention and Fig. 11 represents a section of Fig. 1 on the line 11, 11.

A gas inlet chamber 20 has formed in its roof the gas ports 21, the guide opening 22 and the internal thread 23. At the lower end of said chamber is formed a seat 24 and an internal thread 25.

A curved gas conduit 28 engages the threads 23 at one end and an air regulating device 29 of well known construction is connected to the other end of the conduit 28.

A gas outlet chamber 30 has formed therewith at one side a gas tube 31 which supports the gas tip 32. A seat 34 and an internal thread 35 is formed at the upper end of the chamber 30. From a shoulder 36 at the lower end of the chamber 30 extends the external thread 37. An outlet gas port 38 with the tapered upper portion 39 is formed in the lower end of the chamber 30.

A globe support 45 of well known construction bears up against the shoulder 36 and is held in place by the nut 46 that engages the thread 37. A globe 47 is suspended from the support 45.

A groove 48 in the nut 46 supports the porcelain mantle support 49 of well known construction. A mantle 50 is suspended from the support 49.

A valve chamber 52 has formed at its top end the valve seat 53 and the external thread 54. A port 55 with the valve seat 56 and a port 57 with the valve seat 58 are formed in the bottom of the valve chamber 52. A guide opening 59 is formed in the bottom of the chamber 52. A boss 62 with an opening 63 extends into the chamber 52 from one of its side walls.

A stuffing box 64 with the gland 65 and packing 66 is provided for said opening on the outer side of said side wall of the chamber 52. An annular indicator plate 68 extends from the stuffing box 64. A spindle 70 with the squared ends 71 and 72 is supported in the opening 63 and extends through the boss 62 and the stuffing box 64. A pointer 75 having the arm 76 and 77 is fastened to the squared end 71 of the spindle 70. Chains 78 and 79 extend respectively from the arms 76 and 77. A gear segment 82 is fastened to the squared end 72 of the spindle 70. A valve 83 coacts with the port 55 and has extending from its lower end the guide stem 84 and from its upper end extends the rack 85 which meshes with one side of the gear segment 82. A valve 86 coacts with the port 57 and has extending from its lower end the guide stem 87 and from its upper end extends the rack 88 which meshes with the other side of the gear segment 82.

A guide bracket 91 having the guide openings 92 and 93 is located within the chamber 52 and is fastened to the bottom thereof. The racks 85 and 88 are guided in the guide openings 92 and 93. A supporting plug 96 is in threaded engagement with the thread 35 of the outlet chamber 30. The said plug 96 has formed therethrough the vertical openings 97 and 98. A vertical opening 99 in said plug connects with the horizontal port 100 and the latter connects with the circumferential port 101. A heat insulating sleeve 102 with the upper flange 103 and lower flange 104 is located in the opening 97.

A heat conveying conduit 106 deflected at 107 has the internally threaded flange 108. A connecting bracket 111 is shown with the top flange 112, the bottom flange 113 and the guides 114. The bracket 111 connects the valve chamber 52 and the supporting plug 96. The bottom flange 113 bears on the flange 103 and the top flange 112 bears up against the sheet of asbestos 116, which latter in turn bears up against the bottom valve chamber 52. A cross head 120 is guided in the guides 114. It has formed therein an opening 121 with the locking heel 122. A connecting brace 123 with the starting pin 124 and the notches 125 and 126 extends over the opening 121 of the cross head 120, and an extension 127 is formed with said cross head. A supporting spring 130 has its upper end fastened to the brace 123 and its lower end 131 extends into the notch 126. A plate 135 has formed therewith the journal bearing 136 and the guide openings 137 and 138. The plate 135 is fastened to the bracket 111 by means of the screws 139. A bell crank 142 is shown with the central arm 143 and the side arms 144 and 145. A locking pin 146 on the arm 143 extends through the opening 121 and a pin 147 on the arm 144 extends through the guide opening 137. A pin 148 on the arm 145 extends through the guide opening 138. A pivot 149 extends from the bell crank 142 and is supported in the journal bearing 136.

An operating lever 153 pivoted on the pin 158 extending from the frame 111, is shown with the arms 154, 155 and 156, and an operating chain 157 has one end connected to the arm 156. A spring 159 extends from the bracket 111 and bears up against the arm 156. A bell crank latch is pivoted to the bracket 111 on the pivot 160 and is shown with the arms 161 and 162. A spring casing 165 is fastened to the plate 135 by means of screws 166. The said casing has formed therewith the hub 167 with the slots 168. A heat conduit 169 with the threaded end 170 leads from the lower end of the casing 165. The threaded end 170 engages the interiorly threaded flange 108 of the conduit 106.

A heat conduit 173 extends from the casing 165 and has connected thereto a heat conducting ring 174. The ring 174 surrounds the gas tip 32. A connecting conduit 175 connects the conduits 169 and 173. A spiral spring 177 in the casing 165 has one end secured in the slot 168 and at its other end is formed an eye 178 which is connected to the pin 148 of the bell crank 142. A second spiral spring 179 in the casing 165 has one end secured in the slot 168 and at its other end is formed an eye 180, which is connected to the pin 147 of the bell crank 142.

A gas conduit 184 has in its upper end the guide sleeve 185 and connects the gas port 55 and the opening 98.

A gas conduit 186 has in its upper end the guide sleeve 187 and connects the gas port 57 and the opening 99. The guide sleeves 185 and 187, respectively, guide the stems 84 and 87. A main gas valve 190 coacts with the seat 53 of the valve chamber 52 and has extending therefrom the valve spindle 191, which latter at its upper end is guided in the opening 22 of the gas inlet chamber 20 and its lower end has formed therein a slot 192 which engages the extension 127 of the cross head 120.

A cover is shown with the two portions 195 and 196. Connecting plates for said portions are shown at 197 and 198. The plate 197 is riveted to the portion 195 and the plate 198 is riveted to the portion 196. The portion 195 has formed therein a slot 199 for the arm 156, and the portion 196 has a slot 200 for the heat conduit 173.

To use the valve closer it may be supposed that the valve 190 is closed.

To light gas tip 32, the chain 78 is pulled down and thereby the valve 86 is raised and opened and the valve 83 is closed. Next the chain 157 is pulled down and the arm 154 of the operating lever 153 is swung up to the position shown in Fig. 8. This causes the crosshead 120 to rise, by virtue of which the spindle 191 and the valve 190 are raised, the spring 130 yielding and permitting the locking pin 146 to pass.

The chain 157 is next released and the spring 159 forces the operating lever 153 to take its original position. The gas can now flow from the curved gas conduit 28, through the gas ports 21 of the inlet gas chamber 20, and next through the valve chamber 52. The gas then flows through the gas conduit 186 to the circumferential port 101 and then through the gas tube 31 and finally to the tip 32 where it can be lighted. When the chain 157 is released and the arm 153 swings to its original position the crosshead 120 lowers until the pin 146 contacts with the spring 130. This maintains the main gas valve 190 from its seat 53. The normal position of the locking pin 146 when the springs 177 and 179 are cool is shown in Figs. 7 and 8. When the gas tip 32 is lighted the heat thereof causes heated air to flow into and through the heat conduit 173 which expands the spiral springs 177 and 179. The expansion of the springs causes the bell crank having the arms 143, 144 and 145 to swing to the position shown in Fig. 9, the pin 146 passing through the notch 126 of the connecting brace 123, locking with the heel 122 of the crosshead 120. In case the light from the gas tip 32 is extinguished, the springs 177 and 179 will contract and the bell crank 142 will swing back to the position shown in Fig. 7, the pin 146 passing through the upper notch 125 of the connecting brace 123, and thereby the crosshead 120 will lower and the main gas valve 190 will close against its seat 53 and the flow of gas from the curved gas conduit 28 will be shut off.

In case the gas is to be supplied to the mantle 50 the operator pulls the chain 79 and thereby the valve 83 is raised and the valve 86 is closed. The operator next pulls the chain 157 and the arm 154 of the operating lever 153 is swung up to the position shown in Fig. 8. This causes the crosshead 120 to rise with the valve spindle 191 and valve 190. The spring 130 deflects to enable the pin 146 to pass. The chain 157 is now released and the spring 159 forces the operating lever 153 to take its original position. In this position the gas from the curved conduit 28, enters the gas conduit 184 and flows into the gas outlet chamber 30 and thence through the outlet gas port 38 and from the latter through the mantle support 49 to the mantle 50 when it can be lighted. Heated air will now flow through the heat conveying conduit 106 to the springs 177 and 179. The springs will expand and the bell crank having the arms 143, 144 and 145 will be swung to the position shown in Fig. 9. The pin 146 now locks with the heel 122 of the crosshead 120, and the valve 190 is maintained in its open position.

In case the light of the mantle 150 is extinguished the said springs 177 and 179 will contract and the bell crank 142 will swing back to the position shown in Fig. 7 and thereby the cross head 120 will lower and the main gas valve 190 will close against its seat 53. The flow of gas from the curved gas conduit 28 will then be shut off.

In case it is desired to shut off the light from either the gas tip 32 or the mantle 50 the operator pulls the chain 157 which causes the arm 161 to swing up and thereby the arm 162 swings downwardly, striking the arm 144 of the bell crank 142. This causes the pin 146 to be released from the heel 122, which permits the cross head 120 and the valve 190 to lower and seat on its seat 53.

Having described my invention, what I desire to secure by Letters Patent and claim is:

1. In an automatic valve closer the combination of a gas outlet for a light, a valve chamber, a main gas valve for said chamber, a valve spindle for the valve, a cross head connected to the said spindle, a locking heel in the cross head, a starting pin and a supporting spring connected to the cross head, a bracket supporting said chamber and having guides for the cross head, a journal plate connected to the said bracket, a bell crank journaled to said plate and having a locking pin and two other pins extending therefrom, a pair of springs connected to said two other pins, the said springs located in the heat zone of said light, the said locking pin of said bell crank being maintained distant from said locking heel by said springs when cool and locked with said heel when said springs are heated and means to manually raise the cross head and thereby locate the supporting spring on the locking pin of the bell crank.

2. The combination in an automatic valve closer of a gas outlet for a light, a valve chamber with a seat at its upper end, a main gas valve coacting with said seat, a valve spindle for the valve, a cross head connected to the lower end of the spindle, said cross head having an opening with a locking heel, a connecting brace with a starting pin and a supporting spring connected to the cross head over the opening therein, a connecting bracket supporting said chamber and having formed therein guides for said cross head, a journal plate connected to said supporting bracket, a bell crank having a central arm and a pair of side arms pivoted to said plate, a locking pin extending from said control arm coacting with said heel and spring, a pin extending from each of the other arms of the bell crank, a pair of springs with one end of one connected to the pin of one side arm of the bell crank and one end of the other spring connected to the pin of the other side arm, the said springs within the heat zone of the light controlled by the closer, the said locking pin being maintained distant from the locking heel by the said springs when cool, and locked with said heel when said springs are expanded by heat.

3. In a double valve closer the combination of a valve chamber, a main gas valve for the chamber, means to actuate said valve, a pair of gas conduits with one end of each leading from said chamber, a valve for each conduit, means to simultaneously open one of the latter valves and close the other, a gas tip coacting with one of said conduits, a gas mantle coacting with the other conduit, a pair of springs in the closer within the heat zone of the gas tip and the heat zone of the mantle and connections between the said springs and the main gas valve.

4. In a double automatic valve closer the combination of a valve chamber, a main gas valve for the chamber, actuating means for the valve, a pair of conduits leading from said chamber, means to simultaneously close either one of said conduits and open the other, a gas tip coacting with one of said conduits, a gas mantle coacting with the other conduit, a spring heat casing in the closer, a spring in the casing coacting with the actuating means of the valve, a heat conduit extending from the spring heat casing to said gas tip and a heat conveying conduit extending from the spring heat casing to said mantle.

Signed at the borough of Manhattan, city of New York, in the county of New York and State of New York, this 27th day of May, A. D. 1920.

AURELIO BARCHIESI.